United States Patent [19]

Chen et al.

[11] Patent Number: 4,862,836
[45] Date of Patent: Sep. 5, 1989

[54] OPERATION OF AN INTERNAL COMBUSTION ENGINE WITH A PRE-ENGINE CONVERTER

[75] Inventors: Nai Yuen Chen, Titusville, N.J.; Thomas F. Degnan, Sr., Yardley, Pa.

[73] Assignee: Mobil Oil Corporation, New York, N.Y.

[21] Appl. No.: 133,401

[22] Filed: Dec. 15, 1987

[51] Int. Cl.⁴ ............................................. F02B 43/08
[52] U.S. Cl. .......................................... 123/3; 502/253
[58] Field of Search ............................ 123/3, 180 AC; 252/455 Z

[56] References Cited

U.S. PATENT DOCUMENTS

| | | | |
|---|---|---|---|
| 3,730,910 | 5/1973 | Albers et al. | 252/455 Z |
| 3,855,980 | 12/1974 | Weisz et al. | 123/3 |
| 4,046,522 | 9/1977 | Chen | 48/102 |
| 4,070,993 | 1/1978 | Chen | 123/3 |
| 4,157,375 | 6/1979 | Brown et al. | 252/455 Z |
| 4,180,689 | 12/1979 | Davies et al. | 585/415 |
| 4,304,686 | 12/1981 | Telford | 502/61 |
| 4,350,835 | 9/1982 | Chester et al. | 585/415 |
| 4,392,989 | 7/1983 | Chu et al. | |

FOREIGN PATENT DOCUMENTS 0050021 4/1981 European Pat. Off. .

OTHER PUBLICATIONS

J. P. DeLuca and L. E. Campbell, "Monolithic Catalyst Supports" in Advanced Materials in Catalysis, J. J. Burton and R. L. Garten, eds., Academic Press, New York (1977), pp. 293 to 324.
J. Wei, "Catalysis for Motor Vehicle Emissions", Adv. Catalysis, vol. 24 (1975), pp. 77 ∝ 86.

Primary Examiner—E. Rollins Cross
Attorney, Agent, or Firm—Alexander J. McKillop; Charles J. Speciale; Malcolm D. Keen

[57] ABSTRACT

A method is provided of operating an internal combustion engine comprising subjecting a hydrocarbon fuel of relatively low octane number to conversion at elevated temperatures by passing it through a reaction zone containing a fuel system of unidirectional, e.g., substantially parallel, channels with rigid walls, e.g., a monolith or series of monoliths, at least the internal surfaces of which contain an aluminosilicate zeolite catalyst having a Constraint Index in the approximate range of about 1 to 12 and a silica/alumina ratio in a range of about 20 to 5000, e.g., ZSM-5 preferably containing gallium or zinc, such that the fuel leaving said channels has an increased octane number, and passing the fuel to the combustion chamber of said engine.

15 Claims, 4 Drawing Sheets

OPERATION OF AN INTERNAL COMBUSTION ENGINE WITH A PRE-ENGINE CONVERTER

BACKGROUND OF THE INVENTION

1. Field of the Invention

This invention relates to the operation of an internal combustion engine employing a pre-engine converter for upgrading the octane number of the fuel, which incorporates a monolithic structure comprising a zeolite.

2. Background Information

Pre-engine converters for improving the octane number of fuels utilized in internal combustion engines are known in the art as shown in the Information Disclosure Statement set out hereinafter. As described, such converters utilize a packed bed of catalyst which necessitates that the catalyst be in particulate form, e.g., as pellets, beads or powders.

A significant problem connected with the use of pre-engine converters utilizing a packed bed of catalyst is the relatively large pressure drop incurred in passing the volatized fuel through the packed bed at the high space velocities required for a reasonably sized pre-engine converter. In general, catalyst conversion and engine requirements often require that the catalyst be able to operate in about the 10 to 30 LHSV range, corresponding to a gas hourly space velocity (GHSV) in the range of about 3,000 to 10,000 $hr^{-1}$ pressure drops for particulate catalysts under these conditions can be substantial resulting in serious impairment of engine efficiency. Thus, any means for reducing the problem of pressure drop while still allowing for the advantages of a pre-engine converter in terms of octane enhancement of the fuel being utilized, are very desirable.

Information Disclosure Statement

The following information is disclosed in accordance with the terms of 37 CFR 1.56, 1.97 and 1.98.

U.S. Pat. No. 3,855,980 discloses a pre-engine converter containing a packed bed of a ZSM-5 or ZSM-8 zeolite catalyst. The disclosure refers to a converter vessel containing varying numbers of quarts of catalyst which indicates that the catalyst is employed in particulate form. Also disclosed is the use of hot exhaust gases to provide heat necessary to drive the cracking process occurring within the converter.

U.S. Pat. No. 4,046,522 discloses a pre-engine converter comprising a bed of particulate "cracking catalyst of the ZSM-5 zeolite type" to convert the hydrocarbons in a fuel mixture comprising hydrocarbons and oxygenated organic compounds, to a higher octane gaseous hydrocarbon fuel. Also disclosed is the use of the hot exhaust gases from the engine to heat the hydrocarbons undergoing reaction in the converter.

U.S. Pat. No. 4,070,993 teaches a pre-engine converter containing a ZSM-5 zeolite for the conversion of a low octane fuel, into which oxygen has been mixed, to produce a higher octane gaseous product. The zeolite is employed in the form of a "fixed bed" of presumably a particulate form of the catalyst. The patent also discloses providing heat to the conversion reaction by adding a controlled amount of an oxygen-containing gas, e.g., air, to the fuel being fed to the converter to combust a minor amount of such fuel, and/or by heat exchange with the exhaust gases from the engine.

None of the foregoing references discloses or suggests the use of the pre-engine converter zeolite in the form of a monolith.

J. P. DeLuca and L. E. Campbell, "Monolithic Catalyst Supports" in Advanced Materials in Catalysis, J. J. Burton and R. L. Garten, eds., Academic Press, New York (1977), pages 293 to 324, teach various structures and catalytic agents in monolithic catalysts and methods for their fabrication.

U.S. Pat. No. 3,730,910 teaches various methods for depositing zeolites on substrate surfaces, e.g., monoliths. The deposited zeolite may be used as cracking or hydrocracking catalysts.

J. Wei, "Catalysis for Motor Vehicle Emissions", Adv. Catalysis, Vol. 24 (1975), pages 77–86, teaches the use of monolithic structures comprising various materials useful as oxidation catalysts applied to the treatment of gasoline engine exhaust gases.

U.S. Pat. No. 4,157,375 discloses the reduction of nitrogen oxides in exhaust gas using as catalyst a zeolite, e.g., ZSM-5, in the form of a monolithic honeycomb structure containing channels and prepared by calcining a kaolin preform having the desired shape and treating the calcined preform with a caustic solution.

None of the foregoing references disclosing monolithic catalysts teaches the use of such monoliths in pre-engine converters for the purpose of upgrading low octane fuels.

U.S. Pat. Nos. 4,180,689; 4,304,686; 4,350,835; and European Patent Specification Publication No. 50,021 each discloses a process of converting aliphatic compounds to aromatics utilizing as catalyst a zeolite, e.g., ZSM-5, containing gallium in impregnated or cation exchanged form.

U.S. Pat. No. 4,392,989 discloses a catalyst comprising a zeolite, e.g., ZSM-5, containing gallium and zinc, which is useful in converting paraffinic feeds containing propane to aromatics. Also disclosed for comparison purposes are catalysts consisting of the zeolite plus gallium alone, zinc alone, gallium with palladium, or zinc with palladium.

SUMMARY OF THE INVENTION

In accordance with this invention, a relatively low octane incoming fuel is converted to a higher octane fuel in the operation of an internal combustion engine by passing the incoming fuel at conversion temperatures through a pre-engine converter situated between the fuel pump and the carburetor of the engine, such converter comprising a plurality of unidirectional, preferably substantially parallel channels with rigid walls, at least the internal surfaces of which contain an aluminosilicate zeolite catalyst having a Constraint Index in the approximate range of about 1 to 12 as hereinafter defined, and effective to convert a hydrocarbon mixture of relatively low octane number to a higher octane number. The zeolite may be in acid form but preferably contains gallium or zinc incorporated by ion exchange or impregnation techniques. A zeolite having any combination of acid, gallium and zinc sites may also be used.

The described catalyst structure is preferably in the form of a "monolith" or "monolithic" structure, and the arrangement of the channels is referred to as a "honeycomb," regardless of whether the passageways have a hexagonal cross-section or some other shape, e.g., square. It has been found that the use of a monolithic pre-engine converter of the type described results in substantial improvement in the octane number of the fuel without the relatively large and efficiency reducing pressure drops caused by the use of a converter containing a packed particulate bed of catalyst.

Since the reactions involved in the upgrading of the octane number of the fuel, e.g., cracking, alkylation, and aromatization, require an elevated reaction temperature and are endothermic, it is necessary to supply heat to the reaction. This may be done under the invention by any known means, e.g., heat exchange between the incoming fuel and the hot exhaust gases or by passing the incoming fuel through the heated engine blocks. However, in accordance with another aspect of the invention, heat for the conversion reaction is supplied by injecting a small amount of an oxygen-containing gas, e.g., air, with the fuel into the pre-engine converter containing the monolith incorporating the zeolite catalyst. The resulting partial combination of the fuel provides the necessary heat of reaction in the converter. The low thermal mass of the monolith permits rapid heat up the catalyst bed and the low pressure drop across the monolith permits more complete volatilization of the feed stream.

To start a cold engine, a small amount of the low octane fuel may, for example, be mixed with air and ignited using an electric heating coil to warm up the reactor to at least about 600° F. to initiate the conversion process. After that, only a small amount of air is needed to maintain the reactor temperature. Heat from the exhaust gas may also be used to supply the temperature requirement once the engine is warm, either by passing it through a heat exchanger that transfers heat from the engine exhaust gases or by passing the fuel through the heated engine block.

Heating of the incoming fuel by hot exhaust gases may be accomplished by conventional heat exchange, e.g., wherein the pre-engine converter comprising the monolithic structure of this invention is incorporated in the exhaust manifold of the engine similar to the arrangement shown with packed beds of zeolite catalyst in previously cited U.S. Pat. Nos. 3,855,980 and 4,070,993, or is enclosed within a shell, with the hot exhaust gases flowing through the space between the interior surface of the shell and the exterior surface of the monolith, similar to the arrangement shown in U.S. Pat. No. 4,046,522 with a reactor containing particulate catalyst. However, in accordance with another aspect of the invention a dual catalytic converter is employed containing two distinct systems of channels, e.g., each a monolith or series of monoliths, wherein the two channel systems are aligned so as to provide efficient heat transfer from one channel system to the other; exhaust gas flows through one system and the fuel components flow through the other system, with the oxidizable components of the exhaust gas being exothermically converted to oxidized products such as carbon dioxide and water. Each channel system is composed of a plurality of unidirectional, preferably substantially parallel, channels, with rigid walls. The two systems may be oriented in any convenient angle to each other, e.g., cross-flow, i.e., perpendicular, parallel or at an acute angle, and the flows of gases may be cross-flow, or, if the channels are substantially parallel or at an acute angle, countercurrent or cocurrent in direction. Preferably, the flow directions of the fuel and exhaust gas are cross-flow or countercurrent through parallel channels. At least the inner surfaces of the fuel channels contain a zeolite catalyst as previously defined which is effective in raising the octane number of the fuel, while at least the inner surfaces of the exhaust gas channels contain a catalyst effective in exothermically oxidizing the oxidizable components of the exhaust gas, e.g., to carbon dioxide and water. Preferably, the zeolite catalyst in the fuel channels contains gallium or zinc, or a combination of gallium or zinc with platinum or palladium, incorporated by ion exchange or impregnation, and/or is in the acid, i.e., protonated form, and the catalyst in the exhaust gas channels is a zeolite of the same type utilized in the fuel channels which contains a group VIII metal, e.g., platinum or palladium, or a combination of the two, incorporated by ion exchange or impregnation.

DESCRIPTION OF SPECIFIC EMBODIMENTS

Figure 1:
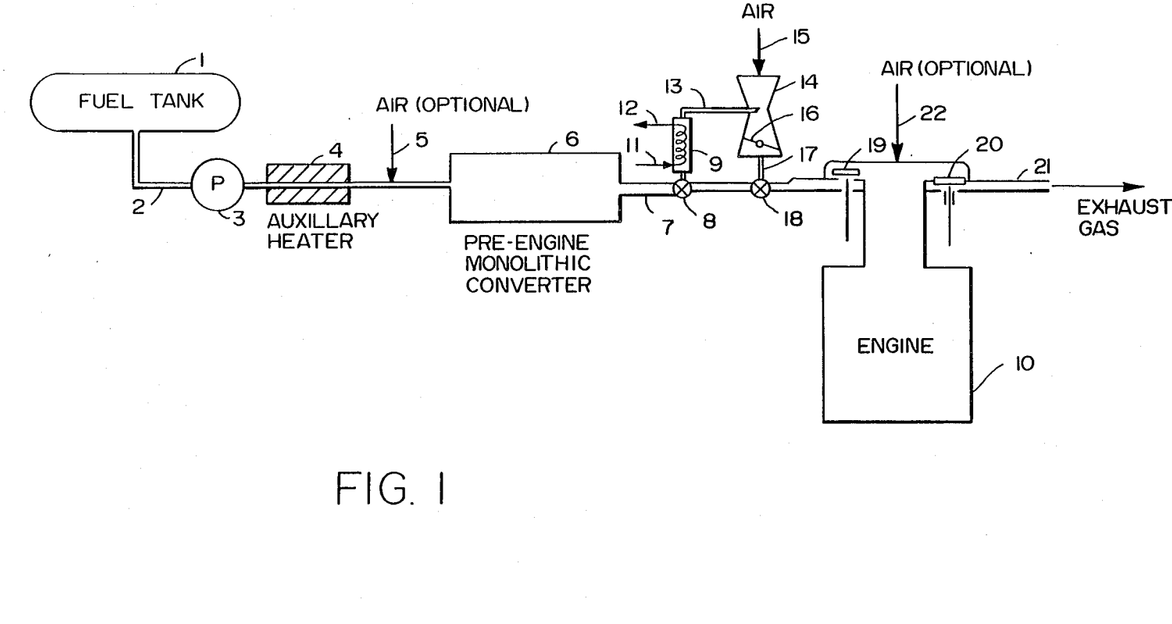
FIG. 1 is a schematic diagram of an internal combustion engine utilizing a pre-engine converter without any heat exchange with exhaust gas.

Referring to FIG. 1, relatively low octane fuel is pumped from fuel tank 1 through line 2 by pump 3 through auxiliary heater 4 where the fuel is volatized and heated at least to a predetermined conversion and/or combustion temperature. The heat source in auxiliary heater 4 in the case of a cold engine may be, for example, the combustion of a small amount of fuel mixed with air and ignited with an electric heating coil, or electricity from internal and/or external batteries, while, in a warm engine, the heat source may be heat from the engine block. Air is optionally added to the heated fuel from line 5 which then passes through pre-engine monolithic converter 6 comprising at least one monolith with channels, at least the surfaces of which contain a zeolite catalyst of the type contemplated under this invention. If air is not added from line 5 to the heated fuel, then the temperature to which the fuel is heated must be high enough such that the heat content of the fuel is sufficient to provide enough heat to sustain the conversion reactions in converter 6 at the necessary temperatures. However, if air is supplied from line 5, then the heat added to the fuel in heater 4 need only be sufficient to heat the fuel to combustion temperature. Thereafter, the partial combustion of the fuel in the presence of oxygen is sufficient to provide the necessary heat to sustain the conversion reaction. From converter 6, the upgraded fuel with increased octane number which despite the heat consumption in converter 6, may still be above ignition temperature, passes through line 7 and depending on the position of selector valve 8, may enter cooler 9 where it is cooled by coolant from the radiator of engine 10 which enters cooler 9 by line 11 and leaves by line 12. The cooled upgraded fuel passes through line 13 to carburetor 14 where it is mixed with air from line 15. The cooled fuel-air mixture, metered by throttle 16, returns through line 17 to line 7 at selector valve 18 and thence through intake valve 19 into the intake manifold of engine 10 for utilization in the engine. Hot exhaust gases are passed through exhaust valve 20 and travel through line 21 to a catalytic converter (not shown) for oxidation of its oxidizable components, or for discharge into the atmosphere. Alternatively, carburetion may be eliminated from the system by positioning selector valves 8 and 18 so that the upgraded fuel from converter 6 passes directly through line 7 into the intake manifold of the engine. In this case, air necessary for combustion of the fuel is injected directly into the engine through line 22.

Figure 2:
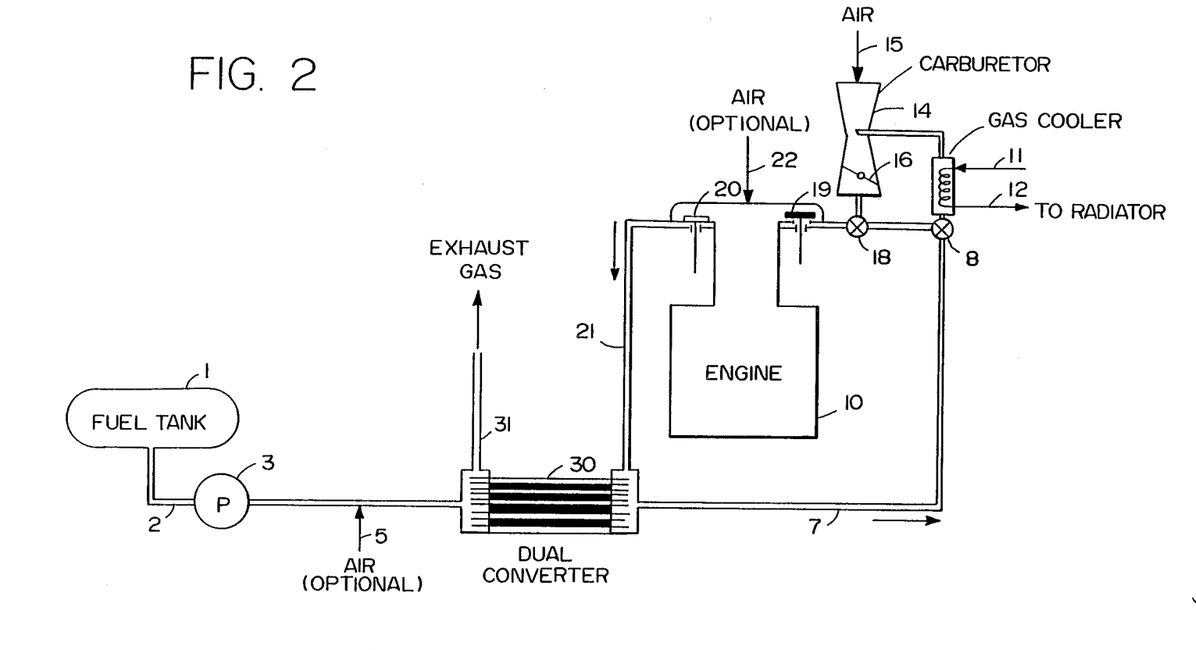
FIG. 2 is a schematic diagram of an internal combustion engine assembly utilizing a monolithic dual catalytic converter which effectuates heat exchange between the exothermic oxidation of oxidizable components in exhaust gas and the endothermic conversion of the incoming fuel to a fuel of higher octane number.

FIG. 2 illustrates an engine assembly similar to that of FIG. 1 except that is utilizes a dual catalytic converter of the type previously described, employing two types of monoliths having different catalysts incorporated therein, in place of the pre-engine converter of FIG. 1. The elements of FIG. 2, which are functionally identical to those of FIG. 1, are identified with the same numerals. Referring now to FIG. 2, when the engine is warm, the relatively low octane income fuel in line 2, after it passes the point of optional addition of air from line 5, enters the channels of the monoliths of the fuel channel system of dual converter 30. There, the fuel is heated to conversion temperature by the exothermic oxidation of oxidizable components in the exhaust gas from engine 10, which enter the channels of the monoliths of the exhaust gas channel system from line 21. The now treated exhaust gas leaves the channels of the exhaust gas channel system of converter 30 and is discharged to the atmosphere from line 31. When the engine is cold, the incoming fuel must be preliminarily heated to combustion temperatures, if air is added prior to the fuel entering converter 30, or to a temperature of above the conversion temperatures, if no air is added, similar to the description of the operation of the engine assembly of FIG. 1 described previously. After the engine warms up, the foregoing preliminary heating may be stopped since the exothermic oxidation of the oxidizable components in the exhaust gas is sufficient to heat the fuel in converter 30 to conversion temperatures.

Figure 3:
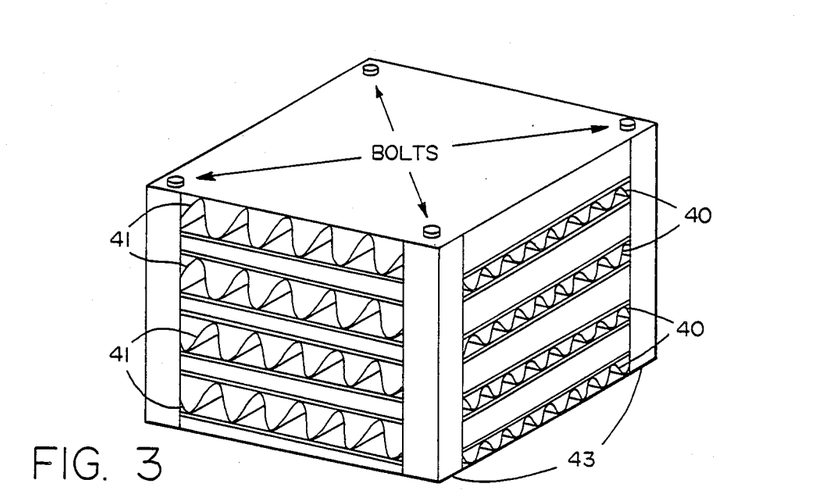
FIG. 3 is a schematic diagram of a dual converter utilizing cross-flow of incoming fuel and exhaust gases and made up of stacked alternating monolith channel systems separated by impermeable plates.

FIG. 3 illustrates a form of monolith assembly suitable for a monolithic dual catalytic converter employing perpendicular cross flow which is suitable for the dual catalytic converter utilized in the engine assembly of FIG. 2. Thus, monolith channel systems 40 are each composed of two parallel square or rectangular external planar elements integral with internal surfaces between them having a sinusoidal cross-section to form parallel channels, with the internal surfaces of the channels containing a zeolite catalyst as herein defined which is effective in catalyzing the conversion of the incoming fuel to a higher octane fuel. The latter monoliths are stacked in alternating fashion with monolith channel systems 41 of matching external shape and similar structure to those of the first type except that the direction of the channels is perpendicular to those of the first type and the internal surfaces of the channels contain a catalyst which is effective in oxidizing the oxidizable components of the exhaust gas of the engine, as defined hereinafter. As shown in FIG. 3, because the volume of volatilized fuel entering the converter is substantially less than the volume of exhaust gas produced per unit time, the thickness and thus the internal surfaces of the monolith channel systems of the fuel system need not be as great as that of the monolith channel systems of the exhaust gas system. To prevent migration of gas from one system to the other system due to permeation through the thin walls of the monolith channel systems, impermeable plates 42, e.g., made of metal or non-porous ceramic, may be placed between each of the monolith channel systems in the stack. The stack of monolith channel systems and impermeable plates may be placed between support posts 43 and bolted into place as indicated. The entire assembly may be placed in a manifold system as shown, for example, in FIG. 4.

Where additional reaction volumes are required, multiple cross-flow units can be configured in various series arrangements as are obvious to those skilled in the art, and enclosed within a shell. The fuel and exhaust gas can then be made to flow in a countercurrent manner by introducing the streams into opposite ends of the trains.

Figure 5:
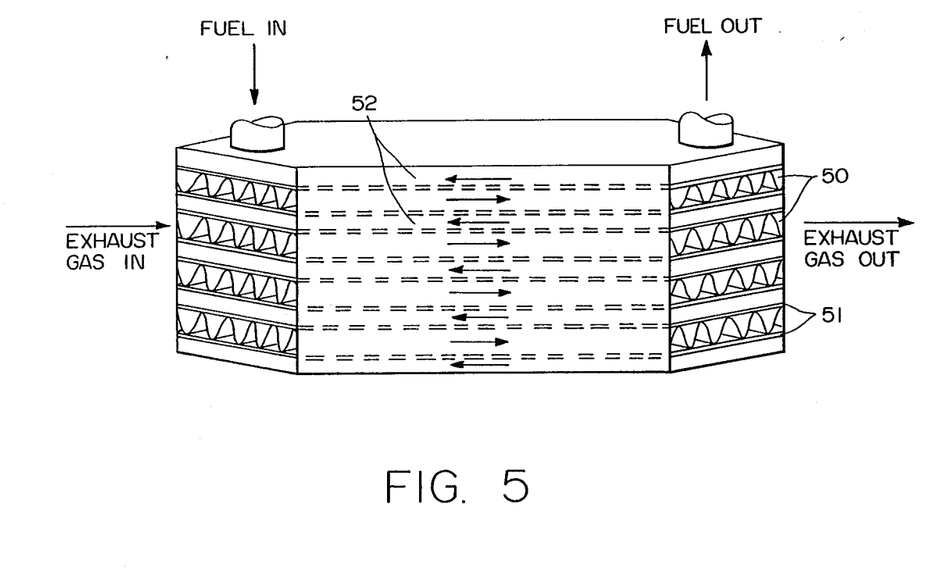
FIG. 5 is a schematic diagram of a dual converter utilizing countercurrent flow of incoming fuel and exhaust gas and made up of stacked alternating monoliths separated by impermeable plates, with the channels of all the monoliths being parallel.

Referring to FIG. 5 which illustrates a dual catalytic converter suitable as dual converter 30 in FIG. 2 and utilizing countercurrent flow of fuel and exhaust gas, the corner cutout sections show exhaust gas monolith channel systems 50, and impermeable plates 41 as they would appear beyond the edges of the fuel monolith channel systems, i.e., between the exhaust gas intake manifold and fuel exhaust manifold in the front left corner of the converter, and between the exhaust gas exit manifold and fuel intake manifold at the front right corner of the converter. The exhaust gas monolith channel systems are also indicated by the arrows pointing to the right at the center of the drawing while fuel monolith channel systems 52, which are not shown in the cutout views, are indicated in the interior of the converter by the arrows pointing to the left.

Figure 4:
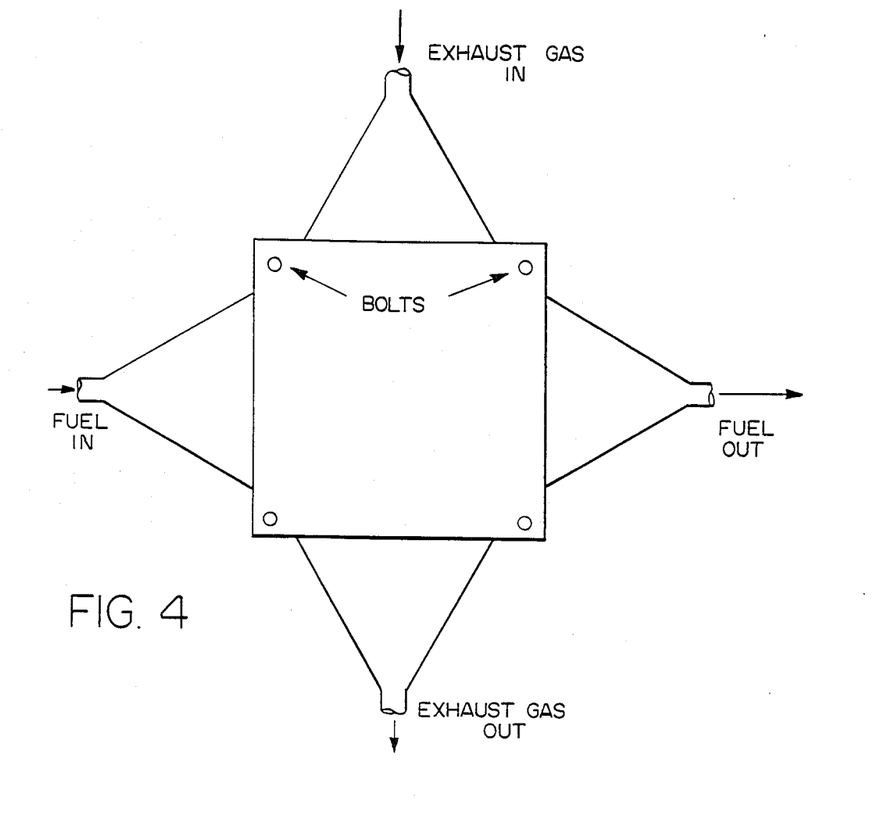
FIG. 4 is a top view of the dual converter of FIG. 3 as part of a cross-flow manifold system.

In the operation of a dual catalytic converter utilizing a monolith assembly as illustrated in FIGS. 4 and 5, heat generated by the combustion of the exhaust gas is transferred through the thin walls of the channels of the exhaust gas monolith channel systems to supply octane ugrading reactions (i.e., aromatization, cracking) taking place in the fuel system of channels. Heat transfer is particularly efficient because the endothermic and exothermic reactions take place at the channel walls; heat transfer is therefore primarily via more efficient conduction rather than less efficient convection. The use of a cross-flow or countercurrent flow design is preferred to maximize the heat transfer efficiency. The cross-flow design allows for particularly compact heat exchanger design and low pressure drop (see, e.g., W. M. Kays and A. L. London, *Compact Heat Exchangers*, 2nd ed. McGraw Hill, New York (1954)).

The zeolite utilized in producing the catalyst incorporated on the surfaces of the channels of the fuel system monolith may be prepared by any of the methods known in the art. Thus, variations of the original method for the production of this type of zeolite utilizing an "organic template" provided by the presence of organic cations, are disclosed in U.S. Pat. Nos. 3,702,886 and Re. 29,948, and European Patent Application Publication No. 130,809. Alternatively, the zeolite may be prepared without employing any organic cations, but utilizing instead seeds of the desired zeolite in the formulating mixture which seeds themselves were formed in the presence of organic ions, etc., as disclosed, for example, in U.S. Pat. Nos. 4,175,114; 4,199,556; and 4,341,748. Moreover, the zeolites contemplated in the process of this invention may be formed in the absence of any organic ions or seeds of the type described, utilizing instead as precursor a silica or aluminosilicate which is precipitated or crystallized from solution or homogenous amorphous phase and having certain characteristics, as disclosed, for example in pending application Ser. No. 014,147, filed Feb. 12, 1987, or European Patent Application Publication No. 106,552 the entire disclosures of which are incorporated by reference. Other methods for the preparation of the desired zeolites, i.e., zeolites having X-ray diffraction patterns typical of such zeolites, are disclosed in the art and may also be used. In general, the zeolite should be prepared using any of the foregoing methods so that the silica/alumina molar ratio of the zeolite is in the range of about 20 to about 5000.

Ion exchange of the zeolite as synthesized can be conducted to effect ammonium exchange at their cationic sites. The source of the ammonium ion is not critical; thus the source can be ammonium hydroxide or an ammonium salt such as ammonium nitrate, ammonium sulfate, ammonium chloride and mixtures thereof. These reagents are usually in aqueous solutions, e.g., of one normal concentration, and ammonium exchange may be conducted in multiple stages. Calcination of the ammonium exchanged zeolite at a temperature, for example, of up to 600° C., will produce the zeolite in its acid, i.e., "H" or protonated form, contemplated for use in the process of this invention.

The octane number enhancing conversion reactions of the present invention may be carried out using catalysts in which a metallic element promoter is impregnated on the surface of the acid form of the zeolite or is ion-exchanged with some of the original cations or ammonium or hydrogen ions of the zeolite using techniques of impregnation or ion-exchange which are well-known in the art. For example, the metallic element may be impregnated on the surface of the zeolite by preparing a solution, e.g., an aqueous solution of the metallic element compound such as the nitrate or chloride and adding to this solution a preshaped form of the desired zeolite, e.g., an extruded monolith, with or without a matrix or binder as hereinafter defined, and allowing the zeolite to be thoroughly contacted with the solution. The contacted catalyst is then dried under vacuum at a moderate temperature, e.g., 100° to 120° C. After calcination, e.g., at 538° C., the zeolite contains the metallic element impregnated on its surface in the form of the metal oxide.

The metallic element in the catalyst composition may be in the ionic form if some cations in the aluminosilicate support have been exchanged with metal ions. In this case, the metal ions are suitably provided as an aqueous solution of a salt such as for instance, the sulfate, nitrate, or chloride. Such catalysts may be produced by conventional ion exchange techniques and the catalysts so produced are subsequently dried. For example, an aqueous solution of a soluble metal compound such as the nitrate may be placed in contact with the ammonium form of a preshaped form of a zeolite at ambient or elevated temperature, e.g., by refluxing. The exchanged zeolite is then washed several times with deionized water and finally dried.

When the catalyst composition is prepared by using a compound of a metal which ionizes in aqueous solution, for example, the nitrate, some of the ions are generally exchanged with the cations in the zeolite even if the preparation was directed to impregnation.

Whichever method of catalyst preparation is used, the amount of metallic element present in the total catalyst composition, if used, may vary, for example, between about 0.5 and 5 percent by weight, preferably between about 0.5 and 2.0 percent by weight. Metallic elements which may be present as promoters in impregnated form or as replacing cations are one or more of various suitable metals in Groups I through VIII of the Periodic Table including by way of example gallium, zinc, platinum, rhenium, cobalt, titanium, tellurium, sodium, nickel, chromium, aluminum, copper, palladium, tin, iron, calcium, manganese, magnesium, cadmium, aluminum and rare earth metals or combinations of two or more elements. Non-metallic modifiers, such as phosphorus may be used. The preferred metallic element promoters are gallium or zinc alone or in combination with platinum, palladium or titanium.

The silica/alumina ratio of the catalyst may be determined by conventional analysis. This ratio is meant to represent, as closely as possible, the ratio in the rigid anionic framework of the zeolite crystal and to exclude aluminum in the binder or in cationic or other form within the channels. Zeolites having a silica/alumina molar ratio near the high point of the contemplated range, e.g., approaching 5000, may be prepared as-synthesized, or by decreasing the aluminum content of low silica to alumina ratio zeolites by steaming, dealuminizing or framework exchange procedures.

The members of the class of zeolites useful herein have an effective pore size of generally about 5 to about 7 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites which provide relatively free access to the internal zeolite structure have a low value for the Constraint Index, and usually pores of large size, e.g., greater than 7 angstroms. The method by which Constraint Index is determined is described fully in U.S. Pat. No. 4,016,218, incorporated herein by reference for details of the method.

Constraint Index (CI) values for some typical materials are:

| CI (at test temperature) | | |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is an important and even critical definition of these zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range to 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

The class of zeolites defined herein is exemplified by ZSM-5, ZSM-11, ZSM-12, ZSM-23, ZSM-35, ZSM-38, ZSM-48, and other similar materials. The compositions, methods of preparation, and X-ray difraction patterns of these zeolites are typified in the following patents: ZSM-5 in the U.S. Pat. Nos. 3,702,886 and Re. 29,948; ZSM-11 in U.S. Pat. No. 3,709,979; ZSM-12 in the U.S. Pat. No. 3,832,449; ZSM-23 in the U.S. Pat. No. 4,076,842; ZSM-35 in U.S. Pat. No. 4,016,245; ZSM-38 in the U.S. Pat. No. 4,046,859; and ZSM-48 in U.S. Pat. No. 4,350,835. The entire disclosures of these patents are incorporated by reference insofar as their disclosures are necessary to identify the respective zeolites.

It is to be understood that by incorporating by reference the foregoing patents to describe examples of specified members of the novel class with greater particularity, it is intended that identification of the therein disclosed crystalline zeolites be resolved on the basis of their respective X-ray diffraction patterns. As discussed above, the present invention contemplates utilization of such catalysts prepared in the manner described, wherein the mole ratio of silica to alumina is at least about 20 and may be as high as about 5000. The incorporation of the identified patents should therefore not be construed as limiting the disclosed crystalline zeolites to those having the specific silica/alumina mole ratios discussed therein, it now being known that such zeolites may have higher silica/alumina ratios and yet, having the same crystal structure as the disclosed materials, may be useful or even preferred in some applications. It is the crystal structure, as identified by the X-ray diffraction "fingerprint", which establishes the identity of the specific crystalline zeolite material.

The preferred crystalline zeolites for utilization herein include ZSM-5, ZSM-11, ZSM-12, ZSM-23, ZSM-35, ZSM-38 and ZSM-48, with ZSM-5 being particularly preferred.

In a preferred aspect of this invention, the zeolites hereof are selected as those providing among other things a crystal framework density, in the dry hydrogen form, of not less than about 1.6 grams per cubic centimeter. Therefore, the preferred zeolites useful with respect to this invention are those having a Constraint Index as defined above of about 1 to about 12, a silica to alumina mole ratio of at least about 20 and up to about 5000, and a dried crystal density of not less than about 1.6 grams per cubic centimeter. The dry density for known structures may be calculated from the number of silicon plus aluminum atoms per 1000 cubic angstroms, as given, e.g., on Page 19 of the article ZEOLITE STRUCTURE by W. M. Meier. This paper, the entire contents of which are incorporated herein by reference, is included in PROCEEDINGS OF THE CONFERENCE OF MOLECULAR SIEVES, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not absorbed by the crystal. Or, the crystal density may be determined by mercury porosimetry, since mercury will fill the interstices between crystals but will not penetrate the intra-crystalline free space.

It is possible that the unusual sustained activity and stability of this special class of zeolites is associated with a high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

|  | Void Volume | Framework Density |
| --- | --- | --- |
| Ferrierite | 0.27 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

In utilizing the catalyst contemplated by this invention in monolithic form, it is advantageous to incorporate the zeolite, prepared in the prescribed manner, with a matrix comprising another material resistant to the temperature and other conditions employed in the process. Such matrix material is useful as a binder and imparts greater resistance to the catalyst for the severe temperature, pressure and reactant feed stream velocity conditions encountered in many conversion processes. Useful matrix materials included both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can by composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, kickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely, with the zeolite content ranging, for example, from between about 10 to about 90 percent by weight.

If a dual catalytic converter is employed as hereinafter described, the exhaust gas system monoliths may contain on the inside surfaces of their channels any catalyst known to be suitable for the combustion of the oxidizable components of the exhaust gas. Some typical catalysts for this purpose, as described in the previously cited Wei article, are noble metals, viz., silver, gold, ruthenium, rhodium, palladium, osmium, iridium or platinum, or base metal oxides and mixtures of oxides, e.g., oxides of copper, chromium, nickel, manganese, cobalt, vanadium, or iron, particularly copper chromites, supported on materials suitable in the formation of monolithic supports, e.g., alumina and related materials such as cordierite, millite and spodumene. However, particularly preferred as the catalyst in the exhaust gas channel system are the zeolites of the type previously described in connection with the catalyst utilized in the monoliths of the fuel channel system, having incorporated therein a Group VIII metallic element, most preferably platinum or palladium. The Group VIII metal may be incorporated using ion-exchange or impregnation techniques similar to those described previously with regard to the incorporation of a metallic element promoter in the zeolite utilized in the fuel system monoliths. The zeolite of the exhaust gas monolith channel system which is preferably the same as that in the fuel channel system before the addition of any metallic elements such as gallium or zinc, may contain, for example, between about 0.05 and 5 percent by weight, preferably between about 0.5 and 2 percent by weight of a Group VIII metal.

The contemplated monoliths of the fuel channel system, and, if a dual catalytic converter is used, the exhaust gas channel system, may be fabricated using any of various methods known in the art, e.g. depositing the zeolite on a preformed substrate as shown in Albers et al., U.S. Pat. No. 3,730,910, previously cited, or by forming the zeolite in situ after the monolith containing a zeolite precursor material such as kaolin is preformed, e.g., as shown in Brown et al., U.S. Pat. No. 4,157,375, also previously cited. Preferably, however, the as synthesized particulate zeolite is comminuted, e.g., ball milled, to reduce the particle size of the zeolite so that it is suitable for extrusion and composited with a binder of the type described. The composite is then extruded into a "green" monolith of the desired shape, dried, and calcined in air at up to about 600° C. Any desired metallic element promoter, e.g., gallium or zinc in the case of monoliths used to upgrade the octane number of the fuel, or platinum or palladium in the case of monoliths used to treat exhaust gas, are then incorporated directly onto the zeolite making up the monolith using any of the previously described ion-exchange or impregnation techniques.

It is particularly surprising and unobvious that monoliths prepared from a ball-milled zeolite as described are effective in upgrading the octane number of a fuel as will be shown hereinafter, since ball-milling is known to damage small crystal zeolites.

The monoliths of the invention may have any convenient shape, e.g., cylindrical tubes enclosing a plurality of channels of any convention cross-section, e.g., square, triangular, hexagonal, etc., or a square or rectangular shape composed of planar elements enclosing inner surfaces having a sinusoidal cross-section, as shown in FIGS. 3 and 5. There may be wide variation in the configuration and dimensions of the monoliths, e.g., as suggested in the previously cited DeLuca et al. and Wei articles, consistent with the purpose and operability of the invention.

Any refinery stream of relatively low octane number and capable of being converted into fuel of higher octane number suitable for use in an internal combustion engine may be fed into the pre-engine converter or the fuel channel system of the dual catalytic converter contemplated under this invention. In general, the temperature of conversion will be at least about 600° F., preferably about 600° to 1100° F. If air or other oxygen-containing gas is added to the incoming fuel before it enters the pre-engine converter or the fuel channel system of the dual converter, the amount of added oxygen will generally be in the range, for example of about 0.01 to 0.1 moles per mole of hydrocarbon. If a dual converter is utilized, then the exhaust gas entering the exhaust gas channel system of the converter will generally be no higher than about 1200° F., preferably in the range of about 700° to 1100° F.

The following examples further illustrate the invention.

EXAMPLES 1 to 5

These examples illustrate the invention applied to a $C_5$-$C_7$ paraffinic naphtha as the relatively low octane incoming fuel, and utilizing as catalyst monoliths comprising a ZSM-5 zeolite in acid form (HZSM-5) or containing gallium (Ga/ZSM-5), or zinc (Zn/ZSM-5), deposited by ion-exchange.

A ZSM-5 aluminosilicate zeolite in its acid form having a silica/alumina ratio of 55 was prepared by means of the procedure taught in European Patent Application Publication No. 130,809 using n-propyl amine as the organic template. The zeolite was ball-milled for 24 hours to reduce the coarseness of the agglomerates as synthesized so that the zeolite was suitable for extrusion. It was then blended with an alumina binder such that the blended composition contained 65 weight percent of zeolite and 35 weight percent of alumina. The composition was then extruded into cylindrical honeycomb monoliths 5 cm. long by 1.5 cm. in diameter and containing 54 square cells/cm². The monoliths were dried, calcined in air at 100° C./hr. to 600° C., and maintained at 600° C. for 1 hr.

Gallium was incorporated onto the foregoing monolith comprising ZSM-5 in acid form by immersing the monolith in a 60 ml solution containing 0.45 grams of $Ga(NO_3)_3.9H_2O$ and allowing it to stand for 3 hours with mild stirring. The monolith was then rinsed with 100 ml of deionized $H_2O$, air dried at room temperature, further dried in an oven at 100° C. overnight, and then calcined at 1° C./min. to 538° C. in dry air. The calcination was allowed to proceed for 3 hours at 538° C. to obtain a monolith comprising ZSM-5 zeolite and containing 1.35 wt. % of gallium based on the monolith.

Zinc was incorporated onto another monolith comprising ZSM-5 in acid form and prepared in the same manner again via ion exchange. In this procedure, the monolith was immersed in a 60 ml solution containing 0.164 grams of $ZnCl_2$ and allowed to stand for 3 hours with mild stirring. The monolith was then rinsed with 100 ml of deionized $H_2O$, air dried at room temperature, further dried in an oven at 110° C. overnight and then calcined at 1° C./min. in 538° C. in dry air. The calcination was allowed to proceed for 3 hours at 538° C. to obtain a monolith comprising ZSM-5 zeolite and containing 1.30 wt. % of zinc based on the monolith.

The cylindrical monoliths were abraded to produce uniform 1.0 cm×5 cm long segments which were placed inside 1.27 cm o.d.×6 cm long pieces of 0.89 mm wall 316 stainless steel tubing. Saureisen No. 78 high temperature ceramic cement was used to bond the monoliths to the inside of the stainless steel tubing. The cement also provided a seal against bypassing of the gas in the annular volume between the monolith and the tubing. The 6 cm long converter was then immersed in an isothermal sandbath. Prior to initiation of the conversion reaction, the converter was heated in the sandbath to 538° C. (1000° F.) or, in Example 3, to 620° C. (1148° F.) in flowing dry air over a 6 hour period. The Ga and Zn containing monoliths were not reduced prior to contacting with the chargestock.

The $C_5$-$C_7$ light paraffinic naphtha chargestock had a research octane number (RON+O) of 52 and an average molecular weight of 87.2 Results of analysis of the chargestock both as to compounds of specific number of carbon atoms and compounds of specific type, are shown in Table I.

TABLE I

| | Wt. % |
|---|---|
| No of C atoms | |
| $C_5$ | 20.1 |
| $C_6$ | 38.2 |
| $C_7$ | 41.1 |
| $C_8$ | 0.6 |
| Compound Type | |
| Paraffins | 84.1 |
| Naphthenes | 11.4 |
| Aromatics | 4.5 |

The chargestock was preheated to reaction temperature and volatilized by pumping it through tubing immersed in the sandbath and surrounding the monolithic converter, and thence into the reactor at a predetermined WHSV while maintaining the sandbath at reaction temperature. Fractions of the product leaving the converter were condensed in ambient liquid, dry ice, and liquid nitrogen traps, with the remainder collected in a gas collector. Conditions of reaction, research octane numbers (RON+O) of the $C_5$+ fraction and total product, and yields of the $C_5$+ fraction are shown in Table II.

TABLE II

| Example | Catalyst | Temp °C. | WHSV hr$^{-1}$ | $C_5$+ RON + O | Total Prod. RON + O | $C_5$+ Yield, wt % |
|---|---|---|---|---|---|---|
| 1 | HZSM-5 | 538 | 6 | 70.7 | 88.2 | 70.2 |
| 2 | HZSM-5 | 538 | 50 | 55.1 | 67.3 | 84.1 |
| 3 | HZSM-5 | 620 | 50 | 54.8 | 79.5 | 61.1 |
| 4 | Ga/ZSM-5 | 538 | 50 | 65.6 | 77.7 | 77.3 |
| 5 | Zn/ZSM-5 | 538 | 50 | 63.7 | 77.0 | 77.4 |

The results of these examples show that, at a constant reaction temperature and space velocity, all the tested catalysts were very effective in substantially raising the research octane number of the paraffinic naphtha stream. However, comparison of Example 2, 4 and 5 indicates that the gallium- and zinc-containing zeolites were considerably more effective than the acid form of the zeolite. Furthermore, comparison of Examples 1 and 2 indicates that lower space velocity results in higher research octane number of both the $C_5$+ fraction and the total product, ut a lower yield of $C_5$+ fraction when using the same catalyst, while comparison of Examples 2 and 3 indicates that raising the reaction temperature results in an increase in research octane number of total product but a reduction in yield of the $C_5+$ fraction.

EXAMPLES 6 to 11

These examples illustrate the process of this invention in upgrading a synthetic $C_6$ gasoline having a research octane number (RON+O) of 78, an average molecular weight of 82, and a composition as shown in Table III.

TABLE III

| Component | Wt. % |
| --- | --- |
| 2,2-Dimethylbutane | 9.11 |
| 2,3-Dimethylbutane | 5.58 |
| 2-Methylpentane | 13.37 |
| n-Hexene-1 | 5.24 |
| Benzene | 47.47 |
| n-Hexane | 19.25 |

The foregoing chargestock was treated to increase its octane number using the procedure of Examples 1 to 5 except that the reaction temperature was 538° C. and the WHSV was 50 for each of the runs. In addition, to test the concept of supplying at least part of the heat requirement of the reaction by combustion of a small amount of the chargestock, 0.046 mole of oxygen as air per mole of hydrocarbon was added to the synthetic $C_6$ gasoline before conversion in examples employing each of the catalysts utilized. Variable reaction conditions and results are shown in Table IV.

TABLE IV

| Example | Catalyst | Added Gas | $C_5+$ RON + O | Total Prod. RON + O | $C_5+$ Yield, wt. % |
| --- | --- | --- | --- | --- | --- |
| 6 | Zn/ZSM-5 | None | 87.6 | 92.6 | 89.4 |
| 7 | Zn/ZSM-5 | Air | 87.4 | 91.8 | 90.3 |
| 8 | Ga/ZSM-5 | None | 90.6 | 95.7 | 88.6 |
| 9 | Ga/ZSM-5 | Air | 90.2 | 94.9 | 89.4 |
| 10 | HZSM-5 | None | 86.5 | 90.9 | 93.2 |
| 11 | HZSM-5 | Air | 86.3 | 89.8 | 94.1 |

The results shown in Table IV indicate again that all the tested catalysts were effective in raising the octane number of the chargestock, with the examples employing zeolites containing gallium or zinc being somewhat more effective than those employing the acid form of zeolite. Furthermore, although the reaction residence times of Examples 7, 9 and 11 were approximately 20% lower than the other examples because of air addition, the results show that air addition has no significant effect on the research octane number of the total product or the $C_5+$ fraction. These results thus indicate that addition of oxygen is an effective method of sustaining the reaction with no substantial sacrifice of product octane number.

The foregoing improvements in octane number of fuels for an internal combustion engine using a zeolite catalyst in monolithic form, are accompanied by substantially lower pressure drops across the pre-engine converter than are obtained with a particulate form of the same catalyst in a packed bed of the same configuration, at equivalent space velocities. Because of this, the process of this invention results in improved efficiency of engine operation. The lower pressure drop across a monolithic converter as compared to an equivalent packed bed converter is quantitatively illustrated by Example 12 in which pressure drops caused by a flowing gas through both types of structure were measured.

EXAMPLE 12

The gas phase pressure drops across a 1 cm diameter monolith (54 square cells/cm², 85% open area) and a 1 cm diameter packed bed of 0.08 cm dia×0.64 cm long extrudates, both of equivalent total mass (0.5 grams) were measured using a manometer. The flow rate of air at room temperature was varied to generate a range of pressure drops across the catalysts. Table V summarizes the results of these measurements:

TABLE V

| | Pressure Drop, kPa | |
| GHSV* | Monolith | Packed Bed |
| --- | --- | --- |
| 5000 | 1.26 | 2.78 |
| 7000 | 1.77 | 5.05 |
| 10000 | 2.32 | 10.11 |
| 20000 | 5.05 | 33.35 |

*Gas Hourly Space Velocity, vol/gas/hr/vol catalyst.

This comparison shows that the monolith consistently has a lower pressure drop than the packed bed of catalyst of equivalent mass. Similar results can be found on page 317 of the monograph by DeLuca and Campbell which was previously cited.

We claim:

1. A method of operating an internal combustion engine comprising subjecting a hydrocarbon fuel of relatively low octane number to conversion at elevated temperatures by passing it through a reaction zone containing a fuel system of unidirectional channels with rigid walls, at least the internal surfaces of which contain an aluminosilicate zeolite catalyst having a Constraint Index in the approximate range of about 1 to 12 and a silica/alumina ratio in the range of about 20 to 5000, such that the fuel leaving said channels has an increased octane number, and passing the fuel to the combustion chamber of said engine.

2. The method of claim 1 wherein said channels are substantially parallel.

3. The method of claim 1 wherein said zeolite is a ZSM-5 zeolite which either (1) is in acid form; (2) contains, gallium; (3) contains zinc; or (4) has any combination of the foregoing attributes.

4. The method of claim 3 wherein said zeolite contains gallium.

5. The method of claim 3 wherein said zeolite contains zinc.

6. The method of claim 1 wherein said fuel system of channels is part of a monolith formed by comminuting said zeolite as synthesized until it has a particle size suitable for extrusion, and extruding a composition comprising said comminuted zeolite to form said monolith.

7. The method of claim 1 wherein the heat requirement for said conversion is at least partially satisfied by adding oxygen to the incoming fuel before it reaches said reaction zone such that a small portion of the fuel is partially combusted before it leaves said reaction zone.

8. The method of claim 1 wherein said fuel system of channels is aligned and in heat exchange relationship with an exhaust gas system of channels with rigid walls, at least the internal surfaces of which contain a catalyst effective for the oxidation of the oxidizable components of said exhaust gas, and through which said exhaust gas flows, and said oxidation takes place so as to at least partially satisfy the heat requirement of said fuel conversion.

9. The method of claim 8 wherein said catalyst effective for the oxidation of oxidizable components of the exhaust gas comprises an aluminosilicate zeolite having a Constraint Index in the approximate range of 1 to 12 and a silica/alumina ratio of about 20 to 5000, and a Group VIII metallic element.

10. The method of claim 9 wherein said zeolite is ZSM-5 and said Group VIII metal is platinum or palladium.

11. The method of claim 9 wherein said catalysts in the fuel channel and exhaust gas channel systems each comprise substantially the same zeolite as synthesized.

12. The method of claim 8 wherein said fuel channel and exhaust gas channel systems are each part of separate monoliths formed by comminuting the zeolite as synthesized from which the catalyst of each system is prepared until its particle size is suitable for extrusion, and extruding compositions comprising each comminuted zeolite to form said monoliths.

13. The method of claim 8 wherein the channels of said fuel system are substantially parallel and the channels of said exhaust gas system are substantially parallel and at right angles to those of said fuel system such that there is cross-flow of said incoming fuel and exhaust gas.

14. The method of claim 8 wherein the channels of said fuel and exhaust gas systems are all substantially parallel and the flows of said fuel and exhaust gas are countercurrent.

15. The method of claim 1 wherein said fuel is preheated prior to entering said fuel system of unidirectional channels, said channels not being in any heat exchange relationship with the exhaust gas of the engine.

* * * * *